United States Patent
Faruque et al.

(10) Patent No.: US 10,500,988 B1
(45) Date of Patent: Dec. 10, 2019

(54) ROTATION ASSEMBLY FOR A VEHICLE

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/021,605

(22) Filed: Jun. 28, 2018

(51) Int. Cl.
*B60N 2/06* (2006.01)
*B60N 2/14* (2006.01)
*B60N 2/90* (2018.01)
*B60N 2/02* (2006.01)

(52) U.S. Cl.
CPC ........... *B60N 2/146* (2013.01); *B60N 2/06* (2013.01); *B60N 2/933* (2018.02); *B60N 2002/022* (2013.01); *B60N 2002/952* (2018.02)

(58) Field of Classification Search
CPC .......... B60N 2/146; B60N 2/933; B60N 2/06; B60N 2002/022; B60N 2002/952
USPC ...... 297/344.22, 344, 23, 344.24; 296/65.13, 296/65.14, 65.15; 248/425, 429, 430
See application file for complete search history.

(56) References Cited

U.S. PATENT DOCUMENTS

| | | | |
|---|---|---|---|
| 2,426,582 A | 9/1947 | Austin | |
| 4,341,415 A | 7/1982 | Braun et al. | |
| 4,844,543 A * | 7/1989 | Ochiai | A47C 3/18 297/344.26 |
| 5,000,505 A | 3/1991 | Kawashita et al. | |
| 5,568,960 A * | 10/1996 | Oleson | B60N 2/143 248/418 |
| 5,636,884 A | 6/1997 | Ladetto et al. | |
| 5,951,106 A | 9/1999 | Hirama et al. | |
| 6,168,234 B1 * | 1/2001 | Haynes | B60N 2/143 297/344.21 |
| 6,231,038 B1 * | 5/2001 | Keyser | H01L 21/68721 269/100 |
| 6,457,765 B1 | 10/2002 | Bergquist et al. | |
| 6,666,514 B2 | 12/2003 | Muraishi et al. | |
| 6,981,746 B2 | 1/2006 | Chung et al. | |
| 7,108,325 B2 * | 9/2006 | Williamson | A47C 3/18 297/344.22 |
| 7,357,451 B2 | 4/2008 | Bendure et al. | |
| 7,658,258 B2 | 2/2010 | Denney | |
| 7,950,740 B2 | 5/2011 | Bunea et al. | |
| 9,114,730 B1 | 8/2015 | Hudson et al. | |
| 9,180,792 B2 * | 11/2015 | Haller | B60N 2/508 |
| 9,227,529 B2 * | 1/2016 | Haller | B60N 2/508 |
| 9,493,242 B2 * | 11/2016 | Oleson | B64D 11/06 |
| 2009/0195037 A1 | 8/2009 | Plavetich et al. | |
| 2014/0167469 A1 * | 6/2014 | Haller | B60N 2/06 297/344.12 |
| 2016/0332540 A1 * | 11/2016 | Martin | B60N 2/06 |
| 2017/0297721 A1 * | 10/2017 | Davis | B60N 2/06 |
| 2017/0320406 A1 * | 11/2017 | Roeglin | B60N 2/10 |

(Continued)

*Primary Examiner* — Muhammad Ijaz
(74) *Attorney, Agent, or Firm* — Vichit Chea; Price Heneveld LLP

(57) ABSTRACT

A rotation assembly for a vehicle includes a ring gear coupled to a frame of the vehicle and having serrations integrally formed therein and an inner ring that rotatably engages with the ring gear. The inner ring may directly mounted to an underside of guide tracks on a seat.

14 Claims, 5 Drawing Sheets

(56) References Cited

U.S. PATENT DOCUMENTS

2018/0043798 A1\* 2/2018 Jacobson ........... B64D 11/0639
2019/0126783 A1\* 5/2019 Baccouche .......... B60N 2/0292

\* cited by examiner

ROTATION ASSEMBLY FOR A VEHICLE

FIELD OF THE DISCLOSURE

The present disclosure generally relates to a rotation assembly. More specifically, the present disclosure relates to a rotation assembly for a vehicle.

BACKGROUND OF THE INVENTION

Vehicles are often provided with a plurality of seats for supporting users. Conventional seats are often provided with an ability to adjust a horizontal position of the seat to accommodate users of various heights and various comfort preferences. However, additional solutions are needed for seats in vehicles that enable greater degrees of customization to the user.

SUMMARY OF THE INVENTION

According to a first aspect of the present disclosure, a rotation assembly for a vehicle includes a ring gear fixedly coupled to a frame of the vehicle. The ring gear includes serrations integrally formed therein. An inner ring rotatably engages with the ring gear. The inner ring is directly mounted to an underside of guide tracks on a seat.

Embodiments of the first aspect of the present disclosure can include any one or a combination of the following features:
- the rotation assembly further includes a locking mechanism that engages with the inner ring and the serrations on the ring gear to define a rotational position;
- the inner ring nests within, and is supported by, the ring gear;
- the inner ring includes one or more retention pins that are actuatable between an extended position and a retracted position to retain the inner ring to the ring gear;
- the retention pins guide the inner ring through rotational motion relative to the ring gear;
- the retention pins are positioned within a groove on the inner ring that extends about a circumference of the inner ring;
- the guide tracks for the seat enable horizontal actuation of the seat relative to the inner ring; and
- the horizontal actuation of the seat relative to the inner ring is independent of the rotational position of the inner ring.

According to a second aspect of the present disclosure, a vehicle includes a rotation assembly mounted directly to a frame of the vehicle and to an underside of guide tracks for a seat. The rotation assembly includes a ring gear that includes serrations integrally formed therein, an inner ring that rotatably engages with the ring gear, and a locking mechanism that engages with the inner ring and the serrations on the ring gear to define a rotational position.

Embodiments of the second aspect of the present disclosure can include any one or a combination of the following features:
- the inner ring nests within, and is supported by, the ring gear;
- the inner ring includes one or more retention pins that are actuatable between an extended position and a retracted position to retain the inner ring to the ring gear and guide the inner ring through rotational motion relative to the ring gear;
- the retention pins are positioned within a groove on the inner ring that extends about a circumference of the inner ring;
- the ring gear is fixedly mounted to the frame of the vehicle;
- the inner ring is mounted directly to the underside of the guide tracks for the seat;
- the guide tracks for the seat enable horizontal actuation of the seat relative to the rotation assembly; and
- the horizontal actuation of the seat relative to the rotation assembly is independent of the rotational position of the rotation assembly.

According to a third aspect of the present disclosure, a vehicle includes a rotation assembly mounted directly to a vehicle frame and to an underside of guide tracks for a seat. The rotation assembly includes a serrated ring gear, an inner ring that nests within, and is supported by, the ring gear, wherein the inner ring rotatably engages with the ring gear and a locking mechanism that engages with the inner ring and the serrated ring gear to define a rotational position.

Embodiments of the third aspect of the present disclosure can include any one or a combination of the following features:
- the inner ring includes one or more retention pins that are actuatable between an extended position and a retracted position to retain the inner ring to the ring gear and guide the inner ring through rotational motion relative to the ring gear;
- the guide tracks for the seat enable horizontal actuation of the seat relative to the rotation assembly; and
- the horizontal actuation of the seat relative to the rotation assembly is independent of the rotational position of the rotation assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
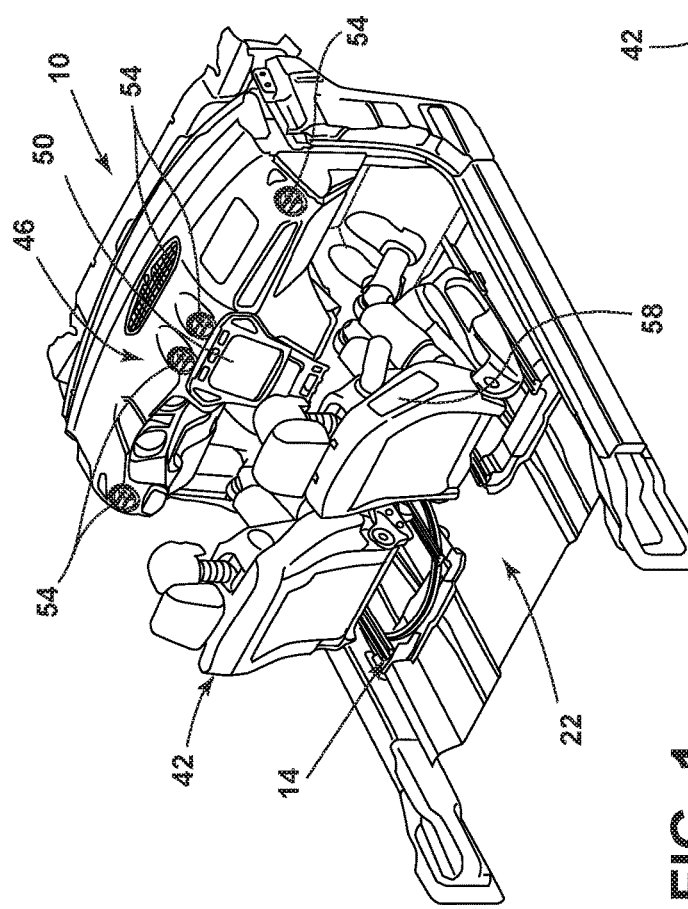
FIG. 1 is a side perspective view of a vehicle illustrating a rotation assembly coupled to a seat and a frame, according to one example.
Figure 2:
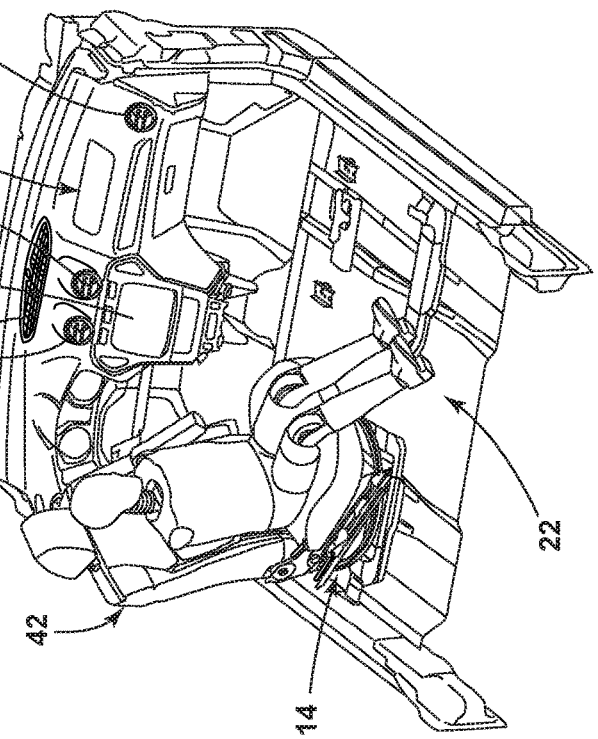
FIG. 2 is a rear perspective view of the vehicle illustrating the seat in a rotated position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a rotation assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6B, a vehicle is generally designated by numeral 10. A rotation assembly 14 for the vehicle 10 includes a ring gear 18 coupled to a frame 22 of the vehicle 10. The ring gear 18 is equipped with serrations 26. An inner ring 30 rotatably engages with the ring gear 18. The inner ring 30 is directly mounted to an underside 34 of guide tracks 38 on a seat 42.

Referring again to FIGS. 1 and 2, the vehicle 10 may be equipped with one or more of the rotation assemblies 14. For example, the rotation assembly 14 can be provided on a driver's seat and/or a passenger's seat. While the seat 42 may be described herein as a driver's seat or a passenger's seat, the present disclosure is not so limited. In some examples, the present disclosure is employed in an autonomous vehicle where a driver is not required and each seating position is considered as a passenger seat. Accordingly, the terms driver seat and passenger seat may be utilized as conventional nomenclature while not being intended as limiting the disclosure to such a seat. The vehicle 10 can include a dash assembly 46 that is disposed at one or more ends of the vehicle 10. The dash assembly 46 can include a vehicle interface 50, such as a human machine interface (HMI). The vehicle interface 50 can be utilized to adjust temperature, comfort, entertainment, and/or destination preferences. The dash assembly 46 is often provided with a plurality of air vents 54 that are utilized for user comfort as well as maintaining visibility to areas outside of the vehicle 10 (e.g., defog and defrost vents). The seats 42 may be provided with a variety of safety features, such as side airbags 58.

Figure 3:
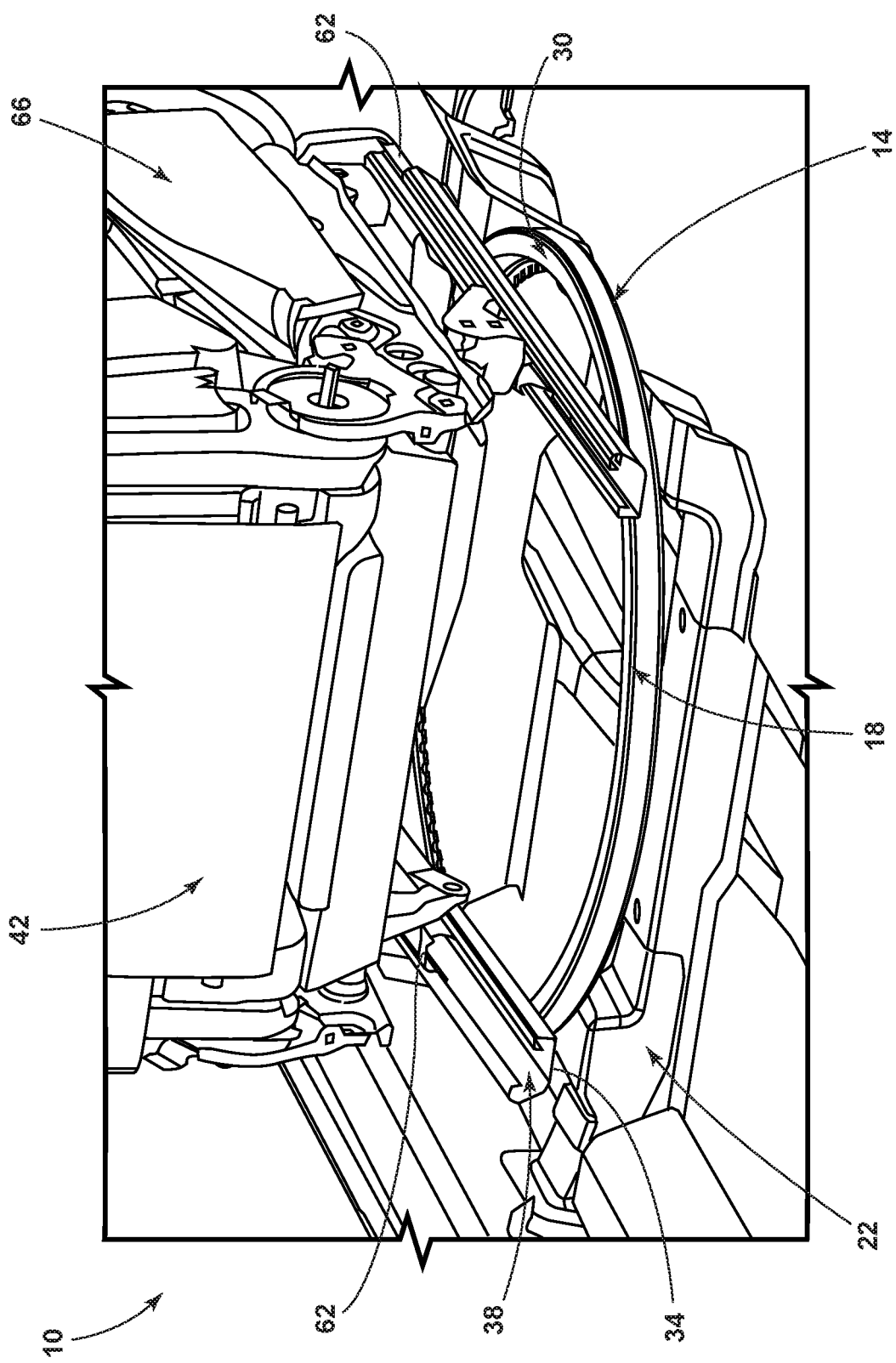
FIG. 3 is a rear perspective view of the seat illustrating a coupling between the frame, the rotation assembly, and the seat, according to one example.

Referring now to FIG. 3, one component of the rotation assembly 14 can be directly mounted to the frame 22 of the vehicle 10 while the other component is indirectly mounted to the frame 22. For example, the ring gear 18 may be mounted directly to the frame 22 of the vehicle 10 while the inner ring 30 is indirectly mounted to the frame 22 by a movable coupling to the ring gear 18. Alternatively, the inner ring 30 may be mounted directly to the frame 22 of the vehicle 10 while the ring gear 18 is indirectly mounted to the frame 22 by a movable coupling to the inner ring 30. In either arrangement, the undersides 34 of the guide tracks 38 are coupled to the movable component of the rotation assembly 14 such that the seat 42 is capable of rotation about a vertical axis. In various examples, the vertical axis is located along a centerline of the seat 42. Said another way, the vertical axis of rotation is located at a center of the rotation assembly 14 as the rotation assembly 14 is generally circular in shape. However, the seat 42 is capable of lateral movement along the guide tracks 38 relative to the rotation assembly 14. Accordingly, the vertical axis of rotation can shift along a centerline of the seat 42 that is parallel to the guide tracks 38. Additionally, in either arrangement, the seat 42 is configured such that there are at least two degrees of freedom, or movement, of seat tracks 62 relative to the frame 22 (e.g., horizontal and rotational movement). The seat tracks 62 are coupled to a seat base 66 of the seat 42 and engage with the guide tracks 38 in a slidable and lockable fashion. The entire seat 42, including the guide tracks 38 and the seat tracks 62, are rotatable relative to the frame 22 of the vehicle 10. In various examples, the guide tracks 38 enable horizontal actuation of the seat 42 relative to at least one of the rotation assembly 14, the ring gear 18, and the inner ring 30. The guide tracks 38 enable the horizontal actuation of the seat 42 by engagement with the seat tracks 62 that slidably and lockably couple to the guide tracks 38. According to various examples of the present disclosure, the inner ring 30 nests within the ring gear 18 and the inner ring 30 is supported by the ring gear 18.

Figure 4:
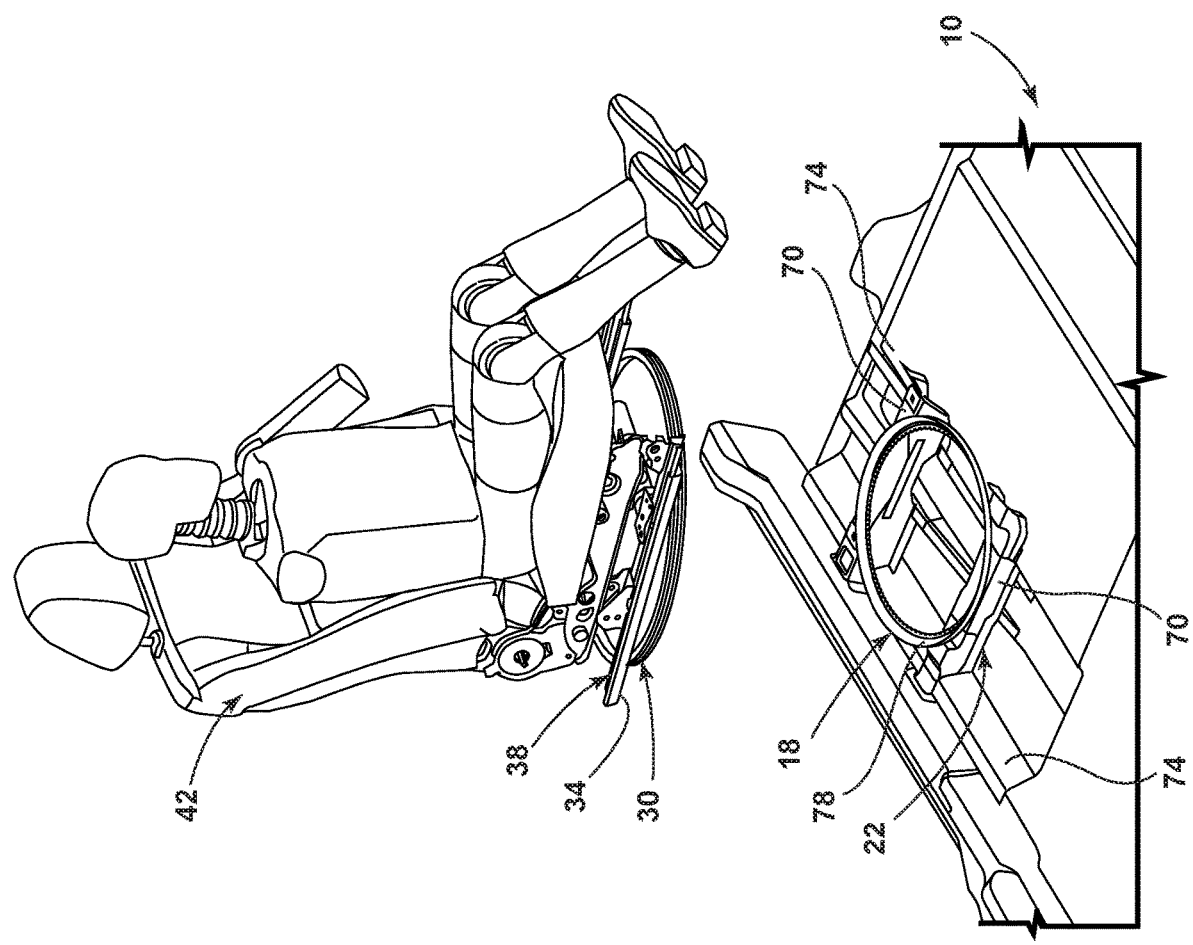
FIG. 4 is an exploded view of the rotation assembly illustrating a ring gear and an inner ring separated from one another, according to one example.

Referring to FIG. 4, the ring gear 18 is coupled to the frame 22 of the vehicle 10. In the depicted example, the ring gear 18 is directly and fixedly coupled to lateral structures 70 and/or one or more longitudinal structures 74 of the frame 22. The rotation assembly 14 may suspend the seat 42 and the guide tracks 38 above the frame 22 such that the seat 42 is supported by point-contacts where the guide tracks 38 meet the rotation assembly 14. The term "point-contacts" as used herein is meant to refer to the guide tracks 38 being suspended above the frame 22 by the rotation assembly 14 rather than the guide tracks 38 contacting the frame 22 in a more continuous fashion. Accordingly, the point-contacts couple the seat 42 to the frame 22 with a smaller surface area than if the guide tracks 38 contacted the frame 22 in a more continuous fashion. The guide tracks 38 are mounted to an upper surface of the inner ring 30 such that an upper surface of a ledge 78 of the ring gear 18 does not support a substantial amount of weight of the seat 42. Accordingly, binding and friction events of the guide track 38 interacting with the ledge 78 of the ring gear 18 are minimized or eliminated. However, the ring gear 18 does support an underside of the inner ring 30 at a location radially inward from the ledge 78 of the ring gear 18. For example, the ring gear 18 can support the underside of the inner ring 30 at a location on the ring gear 18 that is positioned between the ledge 78 and the serrations 26 (see FIG. 6A). The arrangement of the rotation assembly 14 allows the horizontal or lateral actuation of the seat 42 relative to the rotation assembly 14 to be independent of the rotational motion, or rotational position, of the rotation assembly 14. In the depicted example, the horizontal actuation of the seat 42 along the guide tracks 38 is independent of a rotational position of the inner ring 30 relative to the ring gear 18.

Figure 5A:
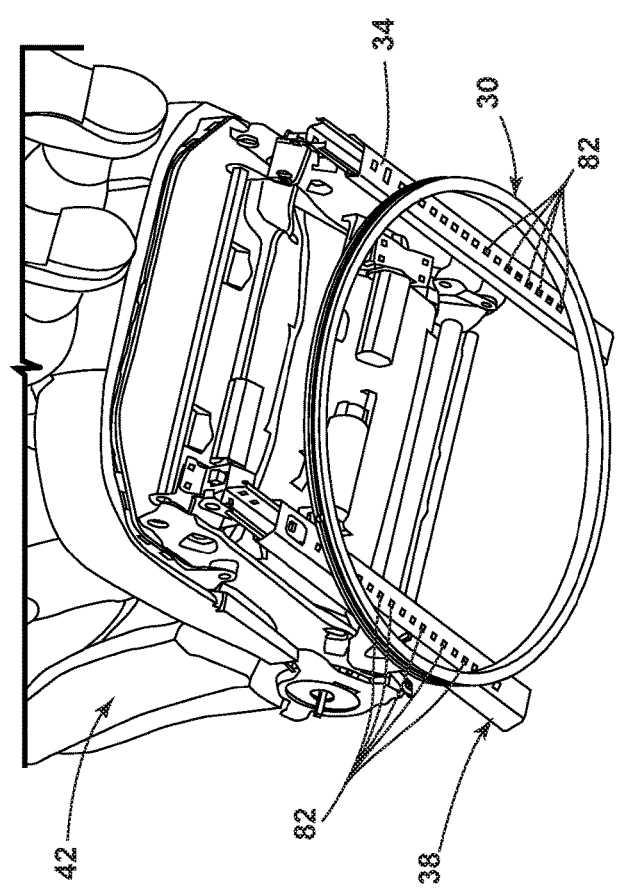
FIG. 5A is a bottom perspective view of the seat illustrating the inner ring coupled to guide tracks, according to one example.
Figure 5B:
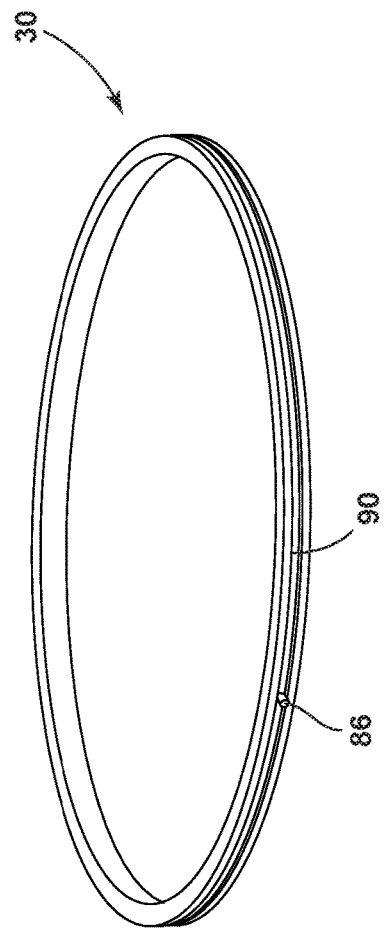
FIG. 5B is a front perspective view of the inner gear illustrating a retention pin, according to one example.

Referring now to FIGS. 5A and 5B, as discussed above, the inner ring 30 is directly coupled to the underside 34 of the guide tracks 38. The direct coupling of the inner ring 30 to the guide tracks 38 can be a fixed coupling such that the inner ring 30 and the guide tracks 38 do not move relative to one another. The guide tracks 38 define a plurality of latch apertures 82 that represent latch points for various lateral or horizontal positions of the seat 42 relative to the inner ring 30 and/or the rotation assembly 14. The seat tracks 62 engage with the guide tracks 38 in a manner that permits horizontal sliding actuation while restricting vertical motion of the seat tracks 62 relative to the guide tracks 38. Accordingly, while the direct coupling of the inner ring 30 to the guide tracks 38 may be a fixed coupling, the seat tracks 62 can nonetheless impart a horizontal degree of freedom to the seat 42 such that a user can adjust the seat 42 as desired in the horizontal direction. To prevent the inner ring 30 from unintentionally becoming decoupled from the ring gear 18, one or more retention pins 86 can be employed. The retention pins 68 are actuatable between an extended position and a retracted position to retain the inner ring 30 to the ring gear 18. In the depicted example, the extended position represents a position that places an outermost edge of the retention pin 86 further from a center point (e.g., rotation axis) of the inner ring 30 than when the retention pin 86 is in the retracted position. The retention pins 86 may be actuated to the retracted position during assembly such that the inner ring 30 can be placed within the ring gear 18. Then, once the inner ring 30 is placed within the ring gear 18, the retention pins 86 can be placed in a fully extended position or a partially-extended position and engage with the ring gear 18. The engagement of the retention pins 86 with the ring gear 18 can guide the inner ring 30 through rotational motion relative to the ring gear 18. For example, the retention pins 86 may engage with a slot that extends about an inner surface of the ledge 78 of the ring gear 18 such that the retention pins 86 are in the partially-extended position or the fully extended position. The retention pins 86, in the depicted example, are positioned within a groove 90 on the inner ring 30 that extends about a circumference of the inner ring 30. The groove 90 is set within an external surface of the inner ring 30.

Figure 6A:
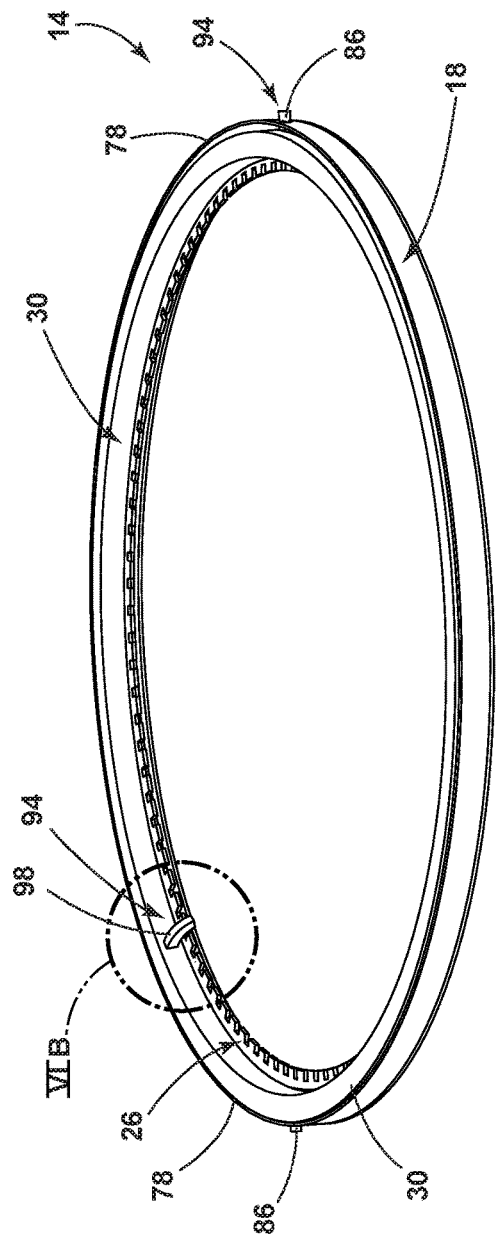
FIG. 6A is front perspective view of the rotation assembly illustrating interactions between various components of the rotation assembly, according to one example.
Figure 6B:
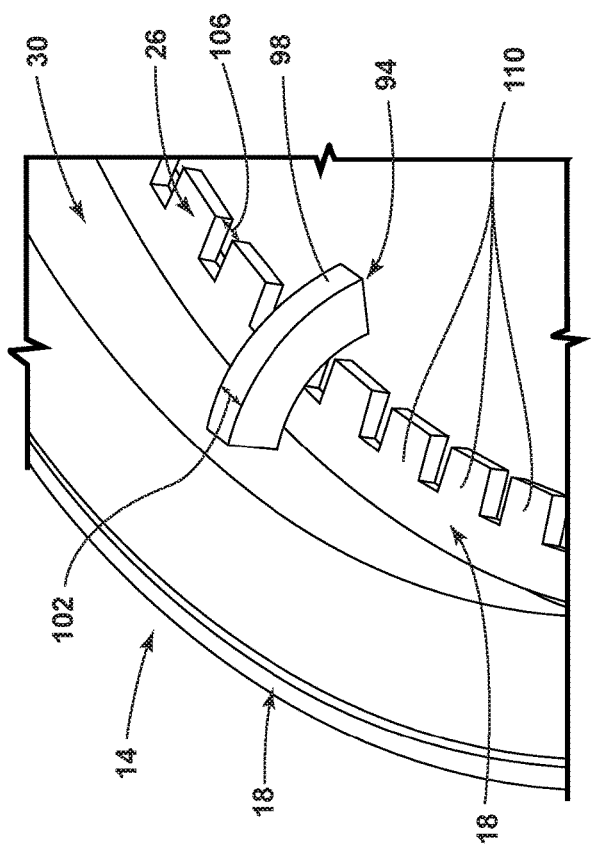
FIG. 6B is an expanded view, taken at section VIB of FIG. 6A, of the rotation assembly illustrating an interaction between serrations of the rotation assembly and a locking pin of the rotation assembly, according to one example.

Referring to FIGS. 6A and 6B, the retention pins 86 can be additionally or alternatively utilized as a component in a locking mechanism 94. For example, the retention pins 86 may pass through apertures located in the ledge 78 such that the engagement between the retention pins 86 and the apertures provides resistance to rotational and/or shear motions that can be experienced during vehicle 10 impact events (e.g., vehicle-to-vehicle collisions, impacts with road debris, impacts with road hazards, etc.). When the retention pins 86 are engaged with the apertures in the ledge 78, the retention pins 86 are in the full-extended position. The retention pins 86 can be biased toward the fully-extended position. When the retention pins 86 are not at a radial position that contains an aperture in the ledge 78, then the retention pins 86 can be positively engaging with an interior side of the ledge 78 in a continuous manner such that upon reaching an aperture in the ledge 78 the retention pins 86 automatically extend through the aperture in the ledge 78. The apertures in the ledge, when employed, are positioned at radial locations that correspond to radial positions of the one or more retention pins 86. The rotation assembly 14 may be equipped with one, two, three, four, or more retention pins 86. It may be beneficial in examples that utilize a plurality of the retention pins 86 to position the retention pins 86 equidistant from one another about the rotation assembly 14. For example, when two retention pins 86 are employed, the retention pins 86 may be about one-hundred-eighty degrees (180°) from each other. In other examples, when three retention pins 86 are employed, the retention pins 86 may be about one-hundred-twenty degrees (120°) from each other. In still further examples, when four retention pins 86 are employed, the retention pins 86 may be about ninety degrees (90°) from each other. In yet another example, when five retention pins 86 are employed, the retention pins 86 may be about seventy-two degrees (72°) from each other.

Referring again to FIGS. 6A and 6B, the locking mechanism 94 may additionally or alternatively include one or more locking pins 98 that are deployably coupled to the rotation assembly 14. The locking pin 98 is operable between an engaged position and a disengaged position. When in the engaged position, as depicted in FIG. 6B, the locking pins 98 of the locking mechanism 94 engage with the inner ring 30 and the serrations 26 on the ring gear 18 to define a rotational position, such as a locked rotational position. The locking pins 98 can be deployable from the inner ring 30 to engage with the serrations 26 on the ring gear 18 such that the inner ring 30 is prevented from unintentional rotational motion. The unintentional rotation can arise from vehicle 10 impact events (e.g., vehicle-to-vehicle collisions, impacts with road debris, impacts with road hazards, etc.). The locking pins 98 have a pin width 102 that is substantial and corresponds with a gap width 106 between teeth 110 of the serrations 26. Accordingly, the locking pins 98 are capable of withstanding substantial shear forces to prevent unintentional rotational motion of the rotation assembly 14 relative to the frame 22 of the vehicle 10. As with the retention pins 86, the rotation assembly 14 may be equipped with one, two, three, four, or more locking pins 98. It may be beneficial in examples that utilize a plurality of the locking pins 98 to position the locking pins 98 equidistant from one another about the rotation assembly 14. For example, when two locking pins 98 are employed, the locking pins 98 may be about one-hundred-eighty degrees (180°) from each other. In other examples, when three locking pins 98 are employed, the locking pins 98 may be about one-hundred-twenty degrees (120°) from each other. In still further examples, when four locking pins 98 are employed, the locking pins 98 may be about ninety degrees (90°) from each other. In yet another example, when five locking pins 98 are employed, the locking pins 98 may be about seventy-two degrees (72°) from each other.

The rotation assembly 14 of the present disclosure provides a weight-efficient package that can be utilized in vehicles 10 with minimal or no alteration to the vehicle 10 and seat 42. Additionally, the entire assembly of the seat 42, including the guide tracks 38 and the seat tracks 62 rotate together. Accordingly, as a user rotates the seat 42 to a desired position, the user can additionally actuate the seat 42 in a horizontal direction to further customize their comfort within the vehicle 10. In one specific example, the rotation assembly 14 of the present disclosure can be utilized to enable a conversation orientation of one or more of the seats 42 within the vehicle 10. In the conversation orientation, the seats 42 can be rotated such that the users in the seats 42 are facing each other directly or at an acute angle (e.g., legs toward one another). In such an orientation, it can be beneficial to maintain the ability to horizontally actuate the seat 42 to allow for additional space between the seats 42 now that the legs of both users are occupying a common area of the vehicle 10.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a rotation assembly coupled to a frame of the vehicle, the rotation assembly comprising:
      a ring gear fixedly coupled to the frame of the vehicle and having serrations integrally formed therein; and
      an inner ring that rotatably engages with the ring gear, wherein the inner ring is directly mounted to an underside of guide tracks on a seat, the inner ring comprising one or more retention pins that are actuatable between an extended position and a retracted position to retain the inner ring to the ring gear, wherein the retention pins guide the inner ring through rotational motion relative to the ring gear, and wherein the retention pins are positioned within a groove on the inner ring that extends about a circumference of the inner ring.

2. The vehicle of claim 1, further comprising:
   a locking mechanism that engages with the inner ring and the serrations on the ring gear to define a rotational position.

3. The vehicle of claim 1, wherein the inner ring nests within, and is supported by, the ring gear.

4. The vehicle of claim 1, wherein the guide tracks for the seat enable horizontal actuation of the seat relative to the inner ring.

5. The vehicle of claim 4, wherein the horizontal actuation of the seat relative to the inner ring is independent of the rotational position of the inner ring.

6. A vehicle, comprising:
- a rotation assembly mounted directly to a frame of the vehicle and to an underside of guide tracks for a seat, wherein the rotation assembly comprises:
  - a ring gear having serrations integrally formed therein;
  - an inner ring that rotatably engages with the ring gear, the inner ring comprising one or more retention pins that are actuatable between an extended position and a retracted position to retain the inner ring to the ring gear and guide the inner ring through rotational motion relative to the ring gear, wherein the retention pins are positioned within a groove on the inner ring that extends about a circumference of the inner ring; and
  - a locking mechanism that engages with the inner ring and the serrations on the ring gear to define a rotational position.

7. The vehicle of claim 6, wherein the inner ring nests within, and is supported by, the ring gear.

8. The vehicle of claim 6, wherein the ring gear is fixedly mounted to the frame of the vehicle.

9. The vehicle of claim 6, wherein the inner ring is mounted directly to the underside of the guide tracks for the seat.

10. The vehicle of claim 6, wherein the guide tracks for the seat enable horizontal actuation of the seat relative to the rotation assembly.

11. The vehicle of claim 10, wherein the horizontal actuation of the seat relative to the rotation assembly is independent of the rotational position of the rotation assembly.

12. A vehicle, comprising:
- a rotation assembly mounted directly to a vehicle frame and to an underside of guide tracks for a seat, wherein the rotation assembly comprises:
  - a serrated ring gear;
  - an inner ring that nests within, and is supported by, the serrated ring gear, wherein the inner ring rotatably engages with the ring gear, wherein the inner ring comprises one or more retention pins that are actuatable between an extended position and a retracted position to retain the inner ring to the ring gear and guide the inner ring through rotational motion relative to the ring gear, and wherein the retention pins are positioned within a groove on the inner ring that extends about a circumference of the inner ring; and
  - a locking mechanism that engages with the inner ring and the serrated ring gear to define a rotational position.

13. The vehicle of claim 12, wherein the guide tracks for the seat enable horizontal actuation of the seat relative to the rotation assembly.

14. The vehicle of claim 13, wherein the horizontal actuation of the seat relative to the rotation assembly is independent of the rotational position of the rotation assembly.

* * * * *